United States Patent Office 2,844,480
Patented July 22, 1958

2,844,480
HYDRAULIC CEMENT COMPOSITIONS FOR WELLS

George K. Greminger, Jr., Midland, Mich., assignor to The Dow Chemical Company, Midland, Mich., a corporation of Delaware No Drawing. Application May 31, 1956
Serial No. 588,252

4 Claims. (Cl. 106—93)

This invention relates to improved cement compositions finding utility in cementing oil wells and the like. More particularly it relates to such cements exhibiting a retarded set and low water loss.

It is common practice in subterranean oil producing operations to fill the annular area surrounding the casing with cementitious materials for various reasons. Procedurally the practice consists of pumping a hardenable aqueous slurry of Portland cement or similar cementitious material into the annular area where it is allowed to set or harden. The aqueous slurries must be within the limits of concentration capable of hardening into a rigid, relatively non-porous substance. When the concentration of water is too great the desired rigid substance is not obtained and the possibility exists that the excess water will diffuse into the oil bearing formation and block the flow of oil into the bore hole. When the water is present in too small an amount, the slurry is difficult to pump, does not have sufficient fluidity and lubricity to flow through small orifices and apertures to effectively seal the annular area, and does not set to a rigid substantially homogeneous substance but remains essentially as a porous sintered mass. Additionally even when the slurry is of proper constitution, there is a tendency for the slurry to lose water at such a rate that it becomes dehydrated and sets prematurely. In those instances the cement cannot be properly placed in position due to the increase in viscosity of the slurry with the resultant increase in pump pressures required to move the slurry. Prior attempts at maintaining a cementing composition in the proper concentrations of ingredients, and in a pumpable viscosity until that composition was in the desired position, have included the incorporation into the slurry of minor amounts of a substance capable of retarding the rate of dehydration. None of those prior substances have been able to meet all the requirements needed in such a substance. In addition to an ability to retard the rate of dehydration, a cement for this purpose should have a high salt and pH tolerance since cementing is frequently employed to seal off flows of saturated brines. Another requirement is its retention of its desirable properties at the relatively high temperatures encountered in very deep oil wells. A still further requirement is resistance to microbial attack so that the dry mixtures may be stored and shipped without loss of desirable properties due to such attack.

It is accordingly the principal object of this invention to provide an improved cementing composition finding use in oil producing operations.

It is a further object to provide such a composition whose aqueous slurries exhibit a reduced water loss and a retarded set.

It is a still further object to provide a new substance for incorporation into such cementing compositions which is capable of retarding the rate of water loss in such compositions.

Other objects will become apparent as the description of the invention proceeds.

It has now been found that improved cementing compositions for use in cementing oil wells result from the incorporation into the composition of certain amounts of a carboxymethyl methyl cellulose ether. The invention likewise contemplates the hardenable aqueous slurries prepared therefrom.

The compositions of this invention are based upon the usual cement compositions employed in oil producing operations. Typically these comprise a hydraulic cement, such as Portland cement or a Portland-type cement. When such cements are mixed with certain amounts of water, a hard hydrate is formed. The proper mixtures of cement and water to form a solid rigid concrete are well known in the art and an investigator will be able to make a judicious choice of concentrations without resort to experimentation.

The carboxymethyl methyl cellulose ethers that are useful in the compositions of this invention are those containing in the same molecule from 0.1 to 0.5 carboxymethyl substituents and from about 0.65 to about 1.05 methyl substituents per average anhydroglucose unit, with a total of at least 1.05 substituent groups per $C_6H_{10}O_5$ unit. These double ethers of cellulose, in the form of the ether itself and calcium, magnesium and sodium salts are water-soluble and are not coagulated in the presence of monovalent or polyvalent anions or cations, and their aqueous solutions do not gel when heated to any temperature up to the boiling point of water. It is additionally known that these double ethers do not behave like a mechanical mixture of methylcellulose and carboxymethylcellulose.

Carboxymethyl methyl cellulose ethers are available commercially in many viscosity grades. By viscosity grade is meant the viscosity of a 2 percent by weight aqueous solution of the ether measured at 20° C. Any of the available viscosity grades operate in the compositions to lower the water loss of the cement compositions. It hs been found that the carboxymethyl methyl cellulose should be employed in a concentration of at least 0.3 percent of the dry weight of the hydraulic cement used in the composition. When less than 0.3 percent is used the aqueous slurries prepared from such compositions do not shown the outstanding retention of water that those compositions do using at least 0.3 percent. No beneficial results accrue from the use of more than about 1.0 percent by weight of carboxymethyl methyl cellulose based on the dry weight of the hydraulic cement and accordingly the compositions will rarely contain more than 1.0 percent.

The carboxymethyl methyl cellulose is most conveniently and preferably incorporated into the mixture by dry blending the hydraulic cement powder and the cellulose ether. Any of the conventional blending procedures may be employed. It is only imperative that the carboxymethyl methyl cellulose be uniformly distributed throughout the mixture. An alternate procedure is to dissolve the cellulose ether into the aqueous phase prior to adding the cement powder. Such a procedure involves double packaging and consequent added expense in storing and shipping the ingredients.

The aqueous slurries prepared from the compositions of this invention show outstanding retention of water and retardation of set time when compared to the prior known compositions. Pumpable slurries may be prepared and pumped into very deep wells without the viscosity of the slurry becoming so great that the slurry reaches an immovable initial set before it is in position. Additionally, the slurries may be employed in areas having high concentrations of salts and in wide ranges of hydrogen ion concentration without serious reduction of the water loss preventive properties. Carboxymethyl methyl cellulose has some surface activity which improves the wetting properties of the slurry, giving increased lubricity. A still further advantage is their resistance to microbial attack so that preservatives are not needed when the compositions are to be stored for prolonged periods in the dry, powdered state.

The advantages of these compositions will be more apparent from the following illustrative examples wherein all parts and percentages are by weight.

EXAMPLE 1

Several samples of aqueous cement slurries were prepared by adding 100 parts of Portland cement to 53 parts of water. Some of the samples contained no other additives and were used for comparative purposes. The remaining samples had varying amounts of carboxymethyl methyl cellulose of both high and low viscosity grades added to the dry cement powder prior to dispersion into water. The samples were cast into slabs and exposed to varying temperatures for setting. The time for the initial set and the final set were measured and are reported.

*Table I*

| Percentage Carboxymethyl Methyl Cellulose | Temp. of set (° C.) | Initial Set | Final Set |
|---|---|---|---|
| None | 70 | 16 hrs., 4 min | 20 hrs., 12 min. |
| 0.1 | 70 | 16 hrs., 1 min | 20 hrs., 1 min. |
| None | 80 | 9 hrs., 18 min | 13 hrs., 56 min. |
| 0.5 (high viscosity grade) | 80 | 18 hrs., 24 min | 20 hrs., 48 min. |
| 0.5 (low viscosity grade) | 80 | 13 hrs., 51 min | 21 hrs., 43 min. |
| None | 90 | 7 hrs., 56 min | 11 hrs., 42 min. |
| 0.5 (high viscosity grade) | 90 | 11 hrs., 24 min | 15 hrs., 56 min. |
| 0.5 (low viscosity grade) | 90 | 13 hrs., 2 min | 14 hrs., 1 min. |
| 1.0 (high viscosity grade) | 90 | 15 hrs., 0 min | 18 hrs., 36 min. |
| 1.0 (low viscosity grade) | 90 | 15 hrs., 2 min | 18 hrs., 14 min. |

The results indicate that the time to reach an initial set can be retarded up to about twice the time required for an unmodified composition by employing carboxymethyl methyl cellulose in the composition.

EXAMPLE 2

Samples similar to those of Example 1 were prepared using varying amounts of carboxymethyl methyl cellulose. Aqueous slurries were prepared from 53 parts water and 100 parts of Portland cement. Where the cellulose ether was employed, it was added to the dry cement and the mixture then dispersed in water. The water loss was measured by placing 135 milliliters of slurry on a number 3 filter paper on a porous but rigid support, applying 100 pounds per square inch gauge pressure to the slurry, and measuring the volume of water passing through the paper in a given time. The results in milliliters of water collected are reported in Table II.

*Table II*

| Percentage Carboxymethyl Methyl Cellulose | Time (mins.) | Water Loss (mls.) |
|---|---|---|
| None | 30 | 55 |
| None | 5 | 53 |
| 0.1 | 10 | 49 |
| 0.5 | 30 | 36 |
| 1.0 | 30 | 6 |

It can be seen that carboxymethyl methyl cellulose effectively retards the rate of water loss from the aqueous cement slurries.

I claim:

1. A cement composition useful in the form of a pumpable aqueous slurry for cementing earthen wells and which exhibits a low water loss and a retarded time to reach an unpumpable set consisting essentially of a hydraulic cement and from about 0.3 to about 1.0 percent by weight of said cementitious material of a water-soluble carboxymethyl methyl cellulose.

2. The composition claimed in claim 1 wherein said hydraulic cement is Portland cement.

3. A dry, powdered pre-mix of the composition claimed in claim 1.

4. An aqueous slurry of a hydraulic cement capable of hardening to a rigid set consisting essentially of an amount of said hydraulic cement capable of setting to a rigid mass through formation of a hydrate of said material and from about 0.3 to about 1.0 percent of a water-soluble carboxymethyl methyl cellulose, based on the dry weight of said hydraulic cement.

References Cited in the file of this patent

UNITED STATES PATENTS

| 2,427,683 | Ludwig | Sept. 23, 1947 |
| 2,614,634 | Lea | Oct. 21, 1952 |
| 2,629,667 | Kaveler | Feb. 24, 1953 |
| 2,673,810 | Ludwig | Mar. 30, 1954 |